United States Patent [19]

Bert

[11] Patent Number: 5,303,865
[45] Date of Patent: Apr. 19, 1994

[54] PLURAL COMPONENT EXTERNAL MIX SPRAY GUN AND METHOD

[75] Inventor: Jeffrey Bert, Boulder, Colo.

[73] Assignee: Binks Manufacturing Company, Franklin Park, Ill.

[21] Appl. No.: 557,981

[22] Filed: Jul. 26, 1990

[51] Int. Cl.⁵ .......................... B05B 1/28; B05B 7/06
[52] U.S. Cl. ........................................ 239/9; 239/294;
239/296; 239/422; 239/428; 239/433
[58] Field of Search .............. 239/418, 422, 428, 433,
239/290, 294, 296, 10, 8, 9

[56] References Cited

U.S. PATENT DOCUMENTS

| | | | |
|---|---|---|---|
| 2,739,843 | 3/1956 | Baur | 239/428 |
| 2,829,006 | 4/1958 | Johansson | 239/294 |
| 3,123,307 | 3/1964 | Bradley | 239/418 |
| 3,330,484 | 7/1967 | Johnson et al. | 239/428 |
| 3,399,834 | 9/1968 | Bradley | 239/428 |
| 3,801,009 | 4/1974 | Marshall, III | 239/433 |
| 3,927,833 | 12/1975 | Harrison et al. | 239/422 |
| 4,042,175 | 8/1977 | Johnson | 239/433 |
| 4,760,956 | 8/1988 | Mansfield | 239/294 |
| 4,770,117 | 9/1988 | Hetherington et al. | 239/422 |
| 4,824,017 | 4/1989 | Mansfield | 239/294 |
| 4,854,504 | 8/1989 | Hedger, Jr. et al. | 239/428 |
| 4,967,956 | 11/1990 | Mansfield | 239/433 |

FOREIGN PATENT DOCUMENTS 273041  2/1964  Australia .................. 239/428

*Primary Examiner*—Andres Kashnikow
*Assistant Examiner*—Christopher G. Trainor
*Attorney, Agent, or Firm*—Juettner Pyle & Lloyd

[57] ABSTRACT

A plural component external mix air-assisted/airless spray gun has an airless tip from which resin is emitted in a fan-shaped spray and an injector nozzle for directing an unatomized stream of catalyst into the resin adjacent to the airless tip. The catalyst injector nozzle is built into an ear of an air cap and the air cap is keyed to the airless tip to guarantee the positional relationship between the injector nozzle and the airless tip. Injecting a stream of unatomized catalyst into the resin stream immediately downstream from the airless tip provides thorough mixing of the catalyst into the resin, increased utilization of the catalyst and decreased emissions of catalyst fumes.

24 Claims, 2 Drawing Sheets

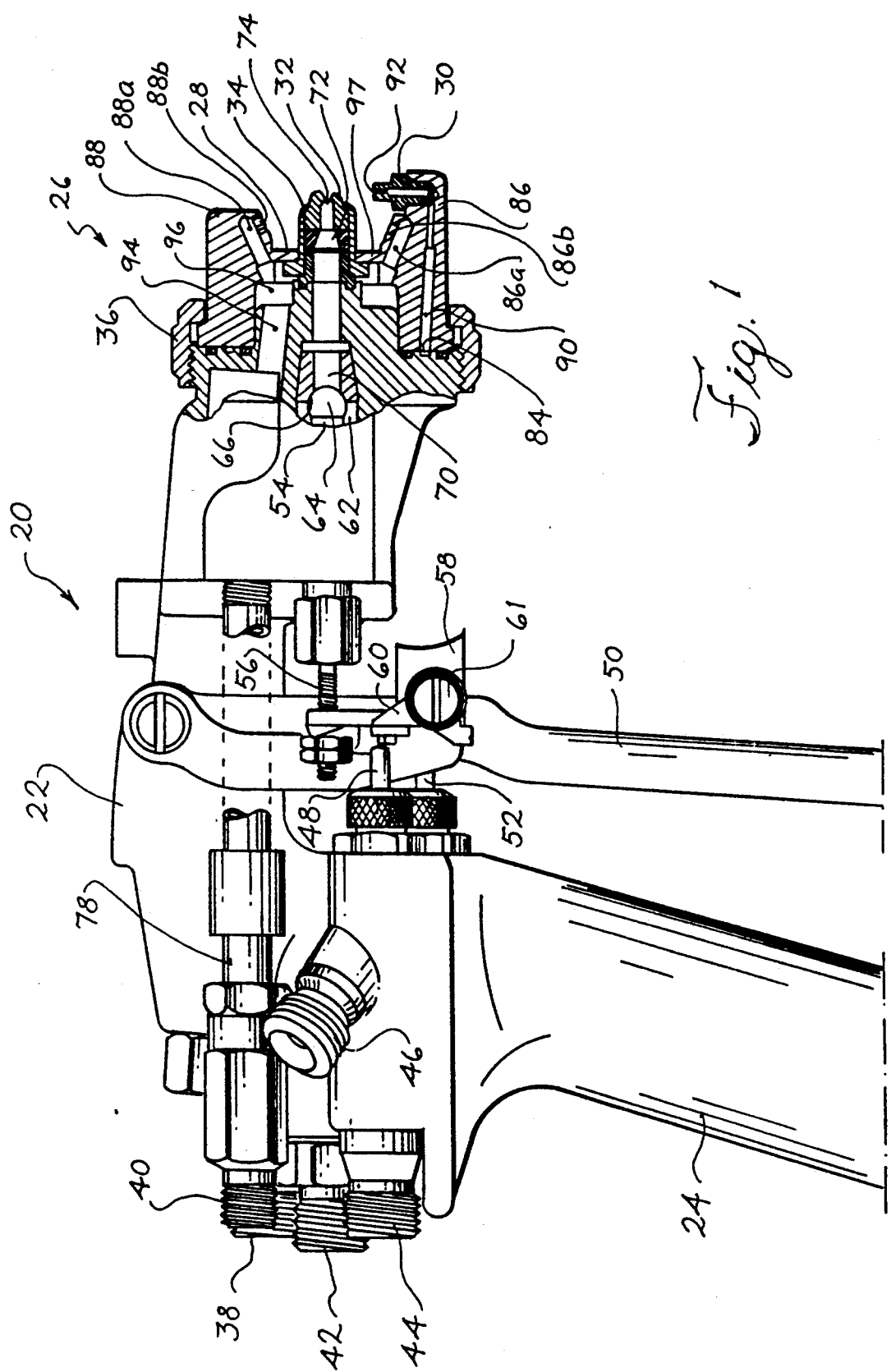

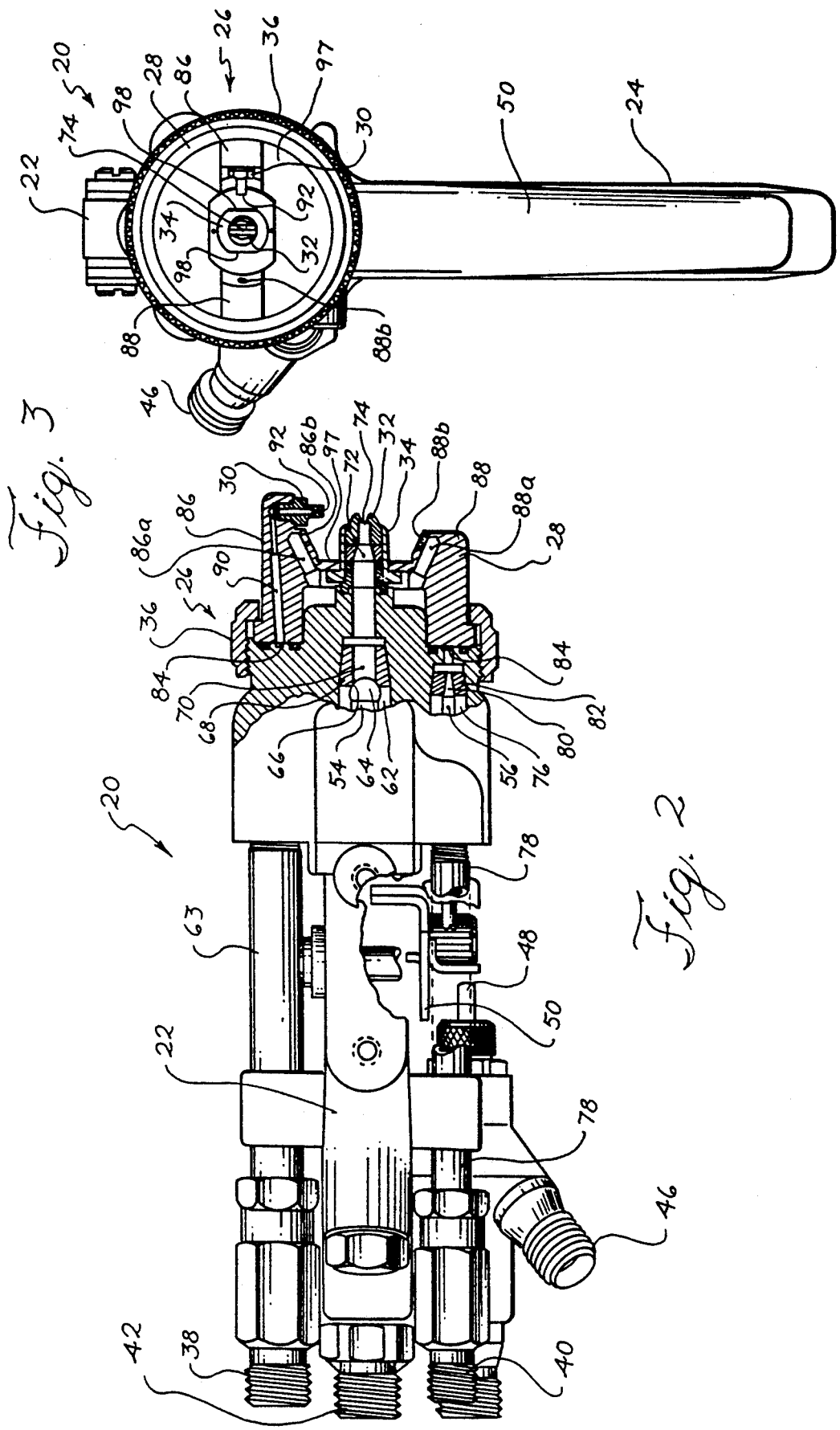

PLURAL COMPONENT EXTERNAL MIX SPRAY GUN AND METHOD

BACKGROUND OF THE INVENTION

The present invention relates to improvements in spray guns, and in particular to a spray gun for spraying two liquid reactants.

One type of spray gun for plural component materials is disclosed in U.S. Pat. No. 3,366,337 to Brooks et al. That spray gun is of the internal mix airless type and means are provided for intimately mixing two liquid reactants immediately prior to spraying the same. This is accomplished by impinging streams of the reactants against each other under pressure from opposed directions into the rearward end of a relatively large mixing chamber within the gun, whereby the reactants are mixed within the chamber and then discharged through an airless outlet orifice at a forward end of the chamber.

At the end of a spraying operation with the spray gun of said Pat. No. 3,366,337, mixed reactants within the chamber must be quickly removed before completion of the reaction and formation of a blockage in the gun. Means are therefore provided for introducing a stream of solvent into the rearward end of the chamber after the gun has been operated, so that the chamber and outlet orifice can be cleaned of residual material to enable further spraying operations. Disadvantages of the technique are that a separate container is usually required to collect the discharge during cleaning, it can happen that solvent contacts and mars a finished product, the use of solvent adds cost to the operation and it is undesirable for solvent to be sprayed into the air. In addition, cleaning the chamber with solvent often is less than thorough, with the result that the gun must be disassembled to remove hardened material, and whenever the gun is not going to be used for a period of time, customary practice contemplates that it be soaked in solvent to remove mixed reactants. Also, with some types of modern day materials, mere impingement together of reactants in a chamber does not provide satisfactory mixing.

One use for plural component spray guns is in fiberglass spraying systems in which resin and catalyst are brought together in a spray into which fiberglass particles are introduced for being wetted and carried to a workpiece. Fiberglass spray guns, often referred to as FRP (fiberglass reinforced plastics) spray guns, may be of either the internal or external mix type. As above discussed, internal mixing of coreactive liquid components such as catalyst and resin requires time consuming and extensive cleaning of the spray gun periodically and after each use. External mixing of the components, on the other hand, decreases the amount of cleaning required. With an external mix spray gun, catalyst and resin streams are emitted from separate nozzles and usually are atomized prior to being mixed together. Because the catalyst and resin are mixed externally of the spray gun, there are no mixed reactants within the gun which must be removed prior to completion of the reaction to prevent a blockage in the gun.

Some major concerns in designing and operating external mix FRP spray guns include providing a thoroughly mixed spray, a sufficiently high utilization of catalyst and low emissions of catalyst fumes. Unless the resin and catalyst are thoroughly mixed the fiberglass curing rate will not be uniform and there will be a lack of uniformity between workpieces. However, it is difficult to properly mix atomized sprays of resin and catalyst. Also, because the catalyst is atomized prior to mixing, a considerable amount of the catalyst spray does not become admixed with the resin spray and there is a decreased utilization of catalyst and an increase in catalyst fumes.

Typical prior spray guns having the aforementioned disadvantages are shown in U.S. Pat. Nos. Re 31,163 to Gardner and 4,618,098 to Hedger et al. and in British U.S. pat. No. 735,983 to Dehn. In each, resin and catalyst are both atomized prior to being mixed, in consequence of which there is less than thorough mixing of the resin and catalyst, low catalyst utilization and relatively high emissions of catalyst fumes.

OBJECTS OF THE INVENTION

An object of the present invention is to provide an improved plural component external mix spray gun in which a first liquid component such as resin is emitted from an airless tip and a second liquid component such as catalyst is directed in an unatomized stream into the first liquid component adjacent to the point of its emission from the airless tip.

Another object is to provide such a spray gun of the air-assisted/airless type.

A further object is to provide such a spray gun in which an injector nozzle for the second liquid component is built into an ear of an air cap for the spray gun and in which the air cap is keyed to the airless tip to maintain the positional relationship between the injector nozzle and the airless tip.

Yet another object is to provide such a spray gun for use in spraying fiber reinforced plastics.

SUMMARY OF THE INVENTION

In accordance with the present invention, a plural component spraying device comprises a fluid tip having an orifice and means for delivering a first liquid to the fluid tip for emission from the orifice in a spray. The spraying device also includes an injector nozzle having an orifice, along with means for delivering a second liquid to the injector nozzle for emission from the injector nozzle in an unatomized stream that impinges against the first liquid adjacent to and downstream from the fluid tip to admix the liquids.

In a contemplated embodiment, the spraying apparatus comprises a spray gun body on which is mounted a fluid nozzle means having an elongate fluid orifice. Means are included for pressure delivery of a first liquid to the fluid nozzle means for emission from its orifice in a fan-shaped expanding and atomized spray, and an air cap means is mounted on the gun body around the fluid nozzle means and has at least two air orifices to opposite sides of the fluid nozzle means. An injector nozzle means having a fluid orifice is carried by the air cap means, and means are provided for pressure delivery of a second liquid to the injector nozzle means for emission from its orifice in an unatomized stream that impinges against the first liquid adjacent to and downstream from the fluid nozzle means to admix the liquids. Also included are means for pressure delivery of air to the air cap means air orifices for emission from the air orifices and impingement against opposite sides of the first and second liquids adjacent to and downstream from the fluid nozzle means to assist in breaking up the first and second liquids into an atomized spray.

The invention also contemplates a method of spraying a plural component material, which comprises the steps of delivering a first liquid under pressure to a fluid tip having an orifice and emitting the first liquid from the fluid tip orifice in a spray. Also included are the steps of delivering a second liquid to an injector nozzle having an orifice and emitting the second liquid from the injector nozzle orifice in an unatomized stream directed against the first liquid adjacent to and downstream from the fluid tip to admix the liquids.

A preferred practice of the method includes the steps of delivering a first liquid under pressure to a fluid nozzle having an elongate fluid orifice, emitting the first liquid from the elongate orifice in a fan-shaped expanding and atomizing spray, and delivering air under pressure to an air cap positioned around the fluid nozzle and having at least two air outlet orifices to opposite sides of the fluid nozzle. Also provided are the steps of delivering a second liquid to a fluid outlet orifice of an injector nozzle on the air cap, emitting the second liquid from the injector nozzle orifice in an unatomized stream directed against the first liquid adjacent to and downstream from the fluid nozzle to admix the liquids, and emitting air from the air cap air outlet orifices and impinging the air against the first and second liquids adjacent to and downstream from the fluid nozzle to assist in atomizing the liquids.

The foregoing and other objects, advantages and features of the invention will become apparent upon a consideration of the following detailed description, when taken in conjunction with the accompanying drawings.

BRIEF DESCRIPTION OF THE DRAWINGS

FIG. 1 is a side elevation view, partly in cross section, illustrating a plural component external mix spray gun according to the teachings of the present invention;

FIG. 2 is a top plan view, partly in cross section, illustrating additional features of the spray gun, and FIG. 3 is a front elevation view of the spray gun.

DETAILED DESCRIPTION

A plural component external mix air-assisted/airless spray coating apparatus is shown in the drawings as a hand held spray gun, indicated generally at 20. The spray gun is for spraying fiberglass and is often referred to in the trade as an FRP (fiberglass reinforced plastics) spray gun. It includes a gun body 22 having a rearward handle 24 grippable by an operator to hold and manipulate the gun. At its forward end the gun body carries a spray head assembly, indicated generally at 26. The spray head assembly includes an air cap 28 which has or in which is mounted a catalyst injector nozzle 30. The spray head assembly also includes an airless spray tip 32 carried by a tip holder 34 that extends through and is surrounded by the air cap. A retaining ring 36 attaches the spray head assembly to the front of the gun body.

The FRP spray gun 20 emits a spray of resin and catalyst into which reinforcing fiberglass particles may be introduced for being wetted and carried by the spray to a workpiece. The gun body 22 has at its rearward end a resin inlet 38, a catalyst inlet 40 and an atomizing air inlet 42. Although not shown, an air powered fiberglass chopper would normally be mounted atop the gun body. To deliver air to the chopper for powering the same, the gun body also has a chopper air inlet 44, a chopper air outlet 46 that connects to the chopper and a chopper air valve 48 for controlling a flow of air from the inlet to the outlet.

A gun trigger 50 is pivotally connected to the spray gun body 22 for actuating an atomizing air valve 52, a resin valve 54 and a catalyst valve 56. The gun trigger is movable between a forward position where the atomizing air, resin and catalyst valves are closed and a rearward position toward the gun handle 24 to open the atomizing air, resin and catalyst valves. A chopper trigger 58 is pivotally connected to the gun body and is moved rearwardly by the gun trigger to open the chopper air valve 48 to operate the chopper. The chopper trigger may also be manually moved rearwardly independently of the gun trigger to open the chopper air valve while the atomizing air, resin and catalyst valves remain closed. The chopper trigger has a valve actuator 60 pivotally mounted at 61 which may be rotated clockwise through 90° from its position shown in FIG. 1 so that upon rearward movement of the chopper trigger the chopper air valve is not engaged and opened. The FRP spray gun 20 can therefore selectively be operated to introduce fiberglass particles into a spray of resin and catalyst, to spray resin and catalyst without introducing fiberglass particles therein or to project fiberglass particles from the gun without simultaneously emitting a spray of resin and catalyst.

The resin valve 54 comprises an elongate stem extending forwardly from the gun trigger 50 into a resin passage 62 in the gun body 22. The resin passage communicates with the resin inlet 38 through a tube 63 and receives resin supplied to the inlet at a pressure on the order of about 300-1000 psi. A ball 64 at the forward end of the stem normally is urged against a seat 66 in a seat holder 68 through which a passage 70 extends. The ball is moved off of the seat upon retraction of the stem by the gun trigger to establish a path for a flow of resin from the passage 62, through the passage 70 and a passage 72 in the tip holder 34, to and through an elliptical orifice 74 in the spray tip 32. The orifice is configured such that resin emitted from it is in the form of a coherent and unstable fan-shaped liquid film that breaks up into an atomized spray at its forward edge.

The catalyst valve 56 comprises a needle valve stem extending forwardly from the gun trigger 50 into a catalyst passage 76. The catalyst passage communicates through a tube 78 with the catalyst inlet 40 for receiving catalyst pressure delivered to the inlet. A conical forward end of the valve stem normally is urged against a seat in a seat holder 82 at a forward end of the catalyst passage. A passage through the seat holder communicates with a circular channel 84 in the forward end of the gun body. The rearward end of the air cap 28 abuts the forward end of the gun body and extends across the channel, and a pair of 0-rings inwardly and outwardly of the channel provide a seal between the gun body and air cap. The air cap has a pair of diametrically opposed ears or horns 86 and 88 and a catalyst delivery passage 90 extends through the ear 86 between the channel 84 and the catalyst injector nozzle 30. When the catalyst valve 56 is retracted from its seat it establishes a path for a flow of catalyst from the passage 76, through the seat holder 82 into the channel 84 and from the channel into and through the air cap passage 90 to the catalyst injector nozzle 30 for emission from a circular catalyst outlet orifice 92 in an unatomized cylindrical stream. The unatomized stream of catalyst is directed into the resin substantially immediately adjacent to the forward end of the airless spray tip 32 and downstream from the point of emission of the resin from the orifice 74 in the tip.

The atomizing air valve 52 is opened upon retraction of the gun trigger 50 to establish a path between the atomizing air inlet 42 and a gun body passage 94 that leads to an annular chamber 96 defined between the forward end of the gun body 22, the air cap 28 and the tip holder 34. Passages 86a and 88a in the air cap horns 86 and 88 extend between the chamber and air outlet orifices 86b and 88b in the horns.

The tip holder extends forwardly through an opening in a front face 97 of the air cap 28 and is keyed to the air cap by means of flats 98 formed on opposite sides of the tip holder and air cap opening. The tip holder and the airless tip are therefore brought into and maintained in fixed positional relationship with respect to the air cap, whereby the elliptical outlet orifice 74 in the airless tip 32 and the catalyst injector nozzle 30 also are maintained in fixed orientation with respect to each other. The orientation of the catalyst injector nozzle with respect to the elliptical orifice is such that a longitudinal axis of a catalyst injector nozzle passage that leads to the circular catalyst outlet orifice 92 extends substantially immediately adjacent to and downstream from the forwardmost end of the airless spray tip 32 and perpendicular to the major axis of the elliptical orifice. This orientation is maintained even when the spray head assembly 26 is rotated to change the plane of the fan-shaped spray, with the annular catalyst channel 84 and the annular air chamber 96 providing for continuous connection of catalyst and air to the spray head for all the rotational orientations of the spray head on the gun body.

Considering operation of the FRP spray gun 20 in emitting a spry of resin and catalyst, upon retraction of the gun trigger 50 the atomizing air valve 52, the resin valve 54 and the catalyst valve 56 are opened. Opening the resin valve provides for a flow of resin to and through the elliptical orifice 74 in the airless spray tip 32. The resin is delivered to the orifice at a pressure on the order of about 300–1000 psi, as a result of which it is emitted from the orifice in the form of a fan-shaped unstable and coherent film of resin that breaks up at its forward edge into an atomized spray.

Because resin is supplied to the airless spray tip 32 at a relatively low pressure, the degree to which it is atomized is less than desirable. The air-assist/airless principle is therefore employed to enhance the degree of atomization. To that end, the air cap outlet orifices 86b and 88a in the air cap horns 86 and 88 are diametrically opposed and lie in a plane extending perpendicular to the major axis of the elliptical orifice 74, and emit jets of air that impact against the resin adjacent where it exits the elliptical orifice to impart additional energy to the resin and cause it to break up into a more finely atomized fan-shaped spray.

Opening the catalyst valve 56 upon retraction of the gun trigger 50 causes catalyst to flow through the catalyst injector nozzle 30 and out of its orifice 92 in a cylindrical unatomized stream that impinges against the resin emitted from the elliptical orifice 74 in the airless spray tip 32. The cylindrical stream of catalyst extends along the axis of the passage through the catalyst injector nozzle, i.e., along an axis passing substantially adjacent to and downstream from the forwardmost end of the airless spray tip 32 and its elliptical orifice 74, and extending perpendicular to the major axis of the elliptical orifice. The circular catalyst orifice may have a diameter on the order of 0.010" and the stream of catalyst emitted from the orifice impinges against the resin stream substantially adjacent to and downstream from its point of emission from the elliptical orifice. At the point of impingement the resin stream has not yet significantly expanded and is still dense and narrow, in consequence of which the catalyst is thoroughly mixed into the resin and carried along with the resin and atomized into a fan-shaped spray. The result is that catalyst utilization approaches 100% and evaporation of catalyst and emission of catalyst fumes is substantially eliminated.

Although not specifically mentioned in describing operation of the FRP spray gun 20, it is understood that the chopper (not shown) would normally be operated during spraying to project fiberglass particles into the admixed and atomized spray of resin and catalyst for being wetted by and carried with the spray to a workpiece.

While one embodiment of the invention has been described in detail, various modifications and other embodiments thereof may be devised by one skilled in the art without departing from the spirit and scope of the invention, as defined in the appended claims.

What is claimed is:

1. A plural component spraying device comprising:
    a fluid tip having an orifice;
    means for pressure delivery of a first liquid to said fluid tip for emission from said orifice in a dense, narrow and expanding film of the first liquid that breaks up downstream from said fluid tip into an atomized spray independent of interaction of air therewith;
    an injector nozzle having an orifice; and
    means for delivering a second liquid to said injector nozzle for emission from said injector nozzle orifice in an unatomized stream that impinges against the first liquid downstream from said fluid tip, at a point where the first liquid is still a dense and narrow film that has not yet atomized into a spray, to admix the liquids.

2. A plural component spraying device as in claim 1, wherein said fluid tip orifice is elongate and said means for delivering the first liquid delivers the same at a pressure sufficient to cause emission of the first liquid from said elongate orifice in a fan-shaped atomized spray.

3. A plural component spraying device as in claim 1, wherein said fluid tip orifice is elongate and has a major axis and said injector nozzle orifice emits the second liquid in an unatomized stream that extends generally perpendicular to said major axis.

4. A plural component spraying device as in claim 2, including means for directing air against the first and second liquids adjacent to and downstream from said fluid tip to assist in atomizing the first and second liquids into a spray.

5. A plural component spraying apparatus, comprising:
    a spray gun body;
    fluid nozzle means mounted on said gun body and having an elongate fluid orifice;
    means for pressure delivery of a first liquid to said fluid nozzle means for emission from said elongate orifice in a fan-shaped expanding, dense and narrow film of the first liquid that breaks up downstream from said orifice into an atomized spray independent of interaction of air therewith;

air cap means mounted on said gun body and having air orifice means;

injector nozzle means carried by said air cap means and having a fluid orifice;

means for pressure delivery of a second liquid to said injector nozzle means for emission from said injector nozzle means orifice in an unatomized stream that impinges against the first liquid downstream from said fluid nozzle means orifice, at a point where the first liquid is still a dense and narrow film that has not yet atomized into a spray, to admix the liquids; and means for pressure delivery of air to said air cap means for emission from said air orifice means and impingement against the first and second liquids adjacent to and downstream from said fluid nozzle means to assist in breaking up the first and second liquids into an atomized spray.

6. A plural component spraying apparatus as in claim 5, wherein said means for pressure delivery of the second liquid includes fluid passage means in said air cap means for delivering the second liquid to said injector nozzle means fluid orifice.

7. A plural component spraying apparatus as in claim 6, wherein said air cap means has a pair of diametrically opposed horns, said injector nozzle means is mounted in and is carried by one of said horns, and said fluid passage means extends through said one horn for delivering the second liquid to said injector nozzle means.

8. A plural component spraying apparatus as in claim 5, wherein said first liquid is resin and said second liquid is catalyst.

9. A plural component spraying apparatus as in claim 5, wherein said fluid nozzle means elongate orifice has a major axis and the second liquid is emitted from said injector nozzle means orifice in a stream extending generally perpendicular to said major axis.

10. A plural component external mix air-assisted/airless spray coating apparatus, comprising:
a spray gun body; and
a spray head assembly carried on said spray gun body, said spray head assembly including:
airless fluid tip means having an elongate fluid outlet orifice;
means for pressure delivery of a first liquid reactant to said airless fluid tip means for emission from said elongate orifice in a dense, narrow and expanding film of the first liquid that breaks up downstream from said elongate orifice into a fan-shaped atomized spray independent of interaction of air therewith;
air cap means around said airless fluid tip means, said air cap means having a pair of air horns to opposite sides of said fluid tip means, air outlet orifices in said horns directed toward said fluid tip means and fluid nozzle means on one of said horns, said fluid nozzle means having a fluid outlet orifice directed toward said fluid tip means;
means for pressure delivery of a second liquid reactant to said air cap fluid nozzle means for emission from said fluid nozzle means orifice in an unatomized stream that is directed for impingement against the first liquid reactant downstream from said airless fluid tip elongate orifice, at a point where the first liquid is still a dense and narrow film that has not yet atomized into a spray, for admixing the liquid reactants; and means for pressure delivery of air to said air cap means for emission from said air outlet orifices and impingement against the first and second liquid reactants adjacent to and downstream from said airless fluid tip to assist in atomizing the first and second admixed liquid reactants.

11. A spray coating apparatus as in claim 10, wherein said means for pressure delivery of the second liquid reactant includes a fluid passage in said one horn of said air cap, and said means for pressure delivery of air includes air passages in said horns.

12. A spray coating apparatus as in claim 11, wherein said pair of air cap horns lie in a plane extending generally perpendicular to a major axis of said elongate fluid outlet orifice and the unatomized stream of the second liquid reactant emitted by said fluid nozzle means orifice extends generally perpendicular to said major axis.

13. A spray coating apparatus as in claim 12, wherein said stream of the second liquid reactant also extends generally perpendicular to the direction of emission of the first liquid reactant from said elongate orifice.

14. A method of spraying a plural component material, comprising the steps of:
delivering a first liquid under pressure to a fluid tip having an orifice;
emitting the first liquid from the fluid tip orifice in a dense, narrow and expanding film that breaks up downstream from the orifice into an atomized spray independent of interaction of air therewith;
delivering a second liquid to an injector nozzle having an orifice; and
emitting the second liquid from the injector nozzle orifice in an unatomized stream directed against the first liquid downstream from the fluid tip, at a point where the first liquid is still a dense and narrow film that has not yet atomized into a spray, to admix the liquids.

15. A method as in claim 16, wherein the fluid tip orifice is elongate and has a major axis and said step of emitting the second liquid directs the second liquid in a stream extending generally perpendicular to the major axis.

16. A method as in claim 14, including the step of directing air against the first and second liquids adjacent to and downstream from the fluid tip to assist in atomizing the liquids.

17. A method of spraying a plural component material, said method comprising the step of
delivering a first liquid under pressure to a fluid nozzle having an elongate fluid orifice;
emitting the first liquid from the elongate orifice in a dense, narrow and expanding film of the first liquid that breaks up downstream from the elongate orifice into a fan-shaped expanding an atomized spray independent of interaction of air therewith;
delivering air under pressure to an air cap having at least one air outlet;
delivering a second liquid to a fluid outlet orifice in the air cap;
emitting the second liquid from the air cap fluid outlet orifice in an unatomized stream directed against the first liquid downstream from the fluid nozzle orifice, at a point where the first liquid is still a dense and narrow film that has not yet atomized into a spray, to admix the liquids; and
emitting air from the at least one air cap air outlet orifice and impinging the air against the first and second liquids adjacent to and downstream from the fluid nozzle to assist in atomizing the liquids.

18. A method as in claim 17, wherein said step of delivering the second liquid includes delivering the second liquid to the air cap fluid outlet orifice through a fluid passage in the air cap.

19. A method as in claim 17, wherein the first liquid is resin and the second liquid is catalyst.

20. A method as in claim 17, wherein the fluid nozzle elongate orifice has a major axis and said step of emitting the second liquid emits the second liquid in a stream that extends generally perpendicular to the major axis.

21. A method of spraying a plural component material, comprising the steps of:

delivering a first liquid reactant to an airless fluid tip having an elongate fluid orifice;

emitting the first liquid reactant from the elongate orifice in a dense and narrow fan-shaped film of the first liquid reactant that breaks up downstream from the fluid tip orifice into a fan-shaped atomized spray independent of interaction of air therewith;

delivering air under pressure to an air cap positioned around the airless fluid tip and having a pair of horns to opposite sides of the airless fluid tip and air outlet orifices in the horns directed toward the airless fluid-tip;

delivering a second liquid reactant to a fluid nozzle in one horn of the air cap;

emitting the second liquid reactant from a fluid outlet orifice of the fluid nozzle in an unatomized stream directed against the first liquid reactant downstream from the airless fluid tip orifice, at a point where the first liquid reactant is still a dense and narrow film that has not yet atomized into a spray, to form an admixture of the first and second liquid reactants; and emitting air from the air cap air outlet orifices and impinging the air against the first and second liquid reactants adjacent to and downstream from the airless fluid tip to assist in atomizing the liquid reactants.

22. A method as in claim 21, wherein said step of delivering the second liquid reactant delivers the same to the fluid nozzle through a fluid passage in the one horn of the air cap.

23. A method as in claim 22, wherein the pair of air cap horns lie in a plane extending generally perpendicular to a major axis of the fluid tip elongate orifice and the unatomized stream of the second liquid reactant extends generally perpendicular to the major axis.

24. A method as in claim 23, wherein the stream of the second liquid reactant also extends generally perpendicular to the direction of emission of the first liquid reactant from the elongate orifice.

* * * * *